(12) United States Patent
Li et al.

(10) Patent No.: US 10,695,821 B2
(45) Date of Patent: Jun. 30, 2020

(54) RIVET FOR FRICTION SELF-PIERCING RIVETING AND FRICTION SELF-PIERCING RIVETING CONNECTION SYSTEM THEREOF

(71) Applicant: SHANGHAI JIAOTONG UNIVERSITY, Shanghai (CN)

(72) Inventors: Yongbing Li, Shanghai (CN); Yunwu Ma, Shanghai (CN); Ming Lou, Shanghai (CN); Zhongqin Lin, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 66 days.

(21) Appl. No.: 16/068,637

(22) PCT Filed: Jun. 23, 2017

(86) PCT No.: PCT/CN2017/089670
§ 371 (c)(1),
(2) Date: Jul. 6, 2018

(87) PCT Pub. No.: WO2018/014699
PCT Pub. Date: Jan. 25, 2018

(65) Prior Publication Data
US 2019/0039119 A1    Feb. 7, 2019

(30) Foreign Application Priority Data

Jul. 19, 2016    (CN) .......................... 2016 1 0566456

(51) Int. Cl.
*B21J 15/02* (2006.01)
*F16B 19/08* (2006.01)
(Continued)

(52) U.S. Cl.
CPC ............. *B21J 15/027* (2013.01); *B21J 5/063* (2013.01); *B21J 15/025* (2013.01); *B21J 15/12* (2013.01);
(Continued)

(58) Field of Classification Search
CPC .......... B21J 5/063; B21J 15/12; B21J 15/025; B21K 25/005; B23P 23/04; F16B 19/086; B23K 20/12
See application file for complete search history.

(56) References Cited

U.S. PATENT DOCUMENTS 3,750,518 A * 8/1973 Rayburn ............... F16B 19/083
411/29

FOREIGN PATENT DOCUMENTS

CN    101817142    * 9/2010

* cited by examiner

*Primary Examiner* — John C Hong
(74) *Attorney, Agent, or Firm* — CBM Patent Consulting, LLC

(57) ABSTRACT

A rivet rotational feeding method for friction self-piercing riveting (F-SPR) system, comprising: a semi-hollow rivet, a driving spindle and a die. The bottom surface of the rivet head is connected to the semi-hollow rivet shank. The semi-hollow rivet shank has a wedge-shaped end. The rivet head has rotation driving structures and positioning structure on the top end. The rotation driving structures are central symmetric concave or convex surfaces. The positioning structure is a central symmetric and mirror symmetric concave or convex surface. The matching between the driving spindle and the rivet can improve the rotation reliability and positioning accuracy of the riveting at a high rotational speed during F-SPR process, which is beneficial to solve the problems of poor stability and non-coincidence between the geometry axis and the rotation axis of the rivet.

10 Claims, 6 Drawing Sheets

(51) Int. Cl.
*B23K 20/12* (2006.01)
*B21J 15/12* (2006.01)
*B23P 23/04* (2006.01)
*B21K 25/00* (2006.01)
*B21J 5/06* (2006.01)

(52) U.S. Cl.
CPC ............ *B21K 25/005* (2013.01); *B23K 20/12* (2013.01); *B23P 23/04* (2013.01); *F16B 19/086* (2013.01)

RIVET FOR FRICTION SELF-PIERCING RIVETING AND FRICTION SELF-PIERCING RIVETING CONNECTION SYSTEM THEREOF

TECHNICAL FIELD

The present disclosure generally relates to vehicle sheet metal joining technologies, and more particularly relates to a rivet rotational feeding method for friction self-piercing riveting (F-SPR) system.

High strength steels, lightweight alloys, such as aluminum alloys, magnesium alloys and composites are being increasingly applied in vehicle industries to reduce the weight of vehicle bodies. However, it is very difficult to join aluminum and magnesium alloys using traditional resistance spot welding process due to the presence of oxide film on the alloy surface, the relative smaller resistance, low heat conduction coefficient, specific heat capacity and linear expansion rate, as well as easy formation of porosity. It is also impossible to weld composites due to their non-conductive properties.

Aiming at solving the technical problems to join lightweight materials, self-piercing riveting (SPR), friction stir spot welding (FSSW) and friction bit joining (FBJ) and some other solid state joining processes are proposed. SPR is able to avoid the problems arising from fusion welding. However, when the stack-up to be joined includes hard-to-deform materials, such as high strength steels, rivet upsetting of even rivet fracture are likely to occur due to the large deformation resistance of the sheet materials, resulting in a poor mechanical interlocking and failure of joining. When the joining stack-up include low ductility materials, such as cast aluminum alloys, magnesium alloys and composites, cracking are like to occur, leading to the failure of the joining and severely breakdown the static and dynamic mechanical performance of the joints. FSSW is a solid state joining process during which diffusion of material is promoted by the rotation motion of the FSSW pin and the generated frictional heat. However, a key hole is left in the FSSW joint, which significantly affects the joint strength. In FBJ process, the solid rivet is driving to spin at a high speed to soften and to penetrate through the top sheet. Then, the rivet bottom portion of the rivet shank is frictional welded to the bottom steel sheet and the top sheet is locked in between the rivet head and the frictional welding interface. By replacing the pin in FSSW process with the solid rigid rivet of FBJ process, the key hole left in FSSW process can be successfully avoided. However, the solid rivet also has a big mass and gap in between the two layers of materials is always formed by applying the solid rivet. In addition, a larger riveting force and a longer process time are always required in FBJ process, which raises the cost of the equipment and lowers the efficiency. At the same time, larger amount of frictional heat is required to weld the rivet strongly to the bottom layer of sheet during the FBJ process, which may cause overheating of the rivet and sheet materials and thus resulting in strength degradation of the joint.

In order to solve the problems of SPR and FBJ processes, friction self-piercing riveting (F-SPR) process is proposed, during which a semi-hollow rivet is driving to rotate along the circumferential direction at a high speed while feeding along the axis direction. The nonferrous alloys and/or high strength steels are therefore softened by the generated frictional heat and the ductility of materials can be improved. A hybrid solid state-mechanical joining joint is then formed by deforming the rivet into the sheet materials to form mechanical interlock and the formation of solid state bonding between the rivet and sheets under the generated frictional heat and the applied riveting pressure at the rivet/sheets interfaces.

However, the semi-hollow rivet used in F-SPR process poses even higher requirements to the process. During F-SPR process, the rivet and the sheet have a ring-shaped contact interface. Under the combined effect of friction and manufacturing error of rivet geometry, the rivet is prone to spin instability, resulting in failure of joints. Meanwhile, when the rivet rotates at a high speed, the deviation between the axis of the semi-hollow rivet shank and the rotational axis may results in gaps in between the rivet shank and the sheets, which would significantly affect the static and dynamic mechanical properties of the joint.

A rivet rotational feeding method for (F-SPR) system is proposed to solve the deficiencies of existing technologies. Through the use of rivet and joining system, the driving stiffness and positioning accuracy of rivet in the F-SPR process can be improved. The problems of the poor spinning stability of the semi-hollow rivet and the non-coincidence rivet geometric axis and the rotation axis can be solved to decrease the probability of joint failure. The proposed method is also capable to avoid the gap between the rivet shank and sheets to ensure the reliability of F-SPR process.

This invention is realized through the following technical schemes:

This invention involves a rivet for F-SPR process, involving a semi-hollow rivet shank and rivet heat, wherein the bottom surface of the rivet head is connected to the rivet shank, the rivet shank has wedge-shaped cone angles at the bottom end, the rivet head has chamfering designed to facilitate assembling and rotatory driving structures on the edge of the top surface, the rivet head has a positioning structure in the center.

The semi-hollow rivet shank has a tip with the vertex of which coincide with the inner wall or the outer wall or between the inner and outer walls.

The chamfering at the edge of the top surface of the rivet head has an angel of 0~75°.

The rotating driving structure is a directed, centrally symmetrical concave or convex surface, wherein the directed structure is a non-mirror symmetric concave or convex surface.

The rotating driving structure is preferably a wedge-shaped notch, a plum blossom boss or a plum shaped groove evenly distributed along the circumferential direction.

The wedge-shaped notch has two intersecting planes, one of which is perpendicular to the surface of the rivet head to bear the circumferential torque, and the other plane is tilted from the surface of the rivet head to the lower end for dynamic engagement.

The intersection angle between the two intersecting planes and the upper surface of the rivet head is 30~75 degrees.

The plum blossom boss contains several petals distributed evenly along the circumferential direction to bear the circumferential torque.

The plum shaped groove contains a number of petals evenly distributed along the circumferential direction to bear the circumferential torque.

The positioning structure has a central symmetry and mirror symmetry, a convex or concave surface with, which is preferably to be a cone shaped groove or a cone shaped boss.

The cone shaped groove is located at the center of the rivet head, and the cone angle of the conical table is less than or equal to 120 degrees.

The cone shaped boss is located at the center of the rivet head, and the angle of the cone shaped boss is less than or equal to 120 degrees.

The conical groove is coaxial with the semi-hollow rivet shank to ensure that the rotation axis of the rivet is coincided with the geometric axis when the torque is applied.

The conical boss and the semi-hollow rivet shank are arranged coaxially to ensure that the rotation axis of the rivet is coincided with the geometric axis when the torque is applied.

The lower surface of the rivet head is designed with an inclination angle of 60~120 degree with the outer surface of the semi-hollow rivet shank to control the material flow of the upper plate.

The disclosed F-SPR system and rivet include a rivet driving spindle, a rivet, a die, and coupons to be joined being set in between the rivet and the die. Wherein the lower surface of the driving spindle matches the shape of the surface of the rivet.

Wherein the rotation driving structure at the bottom edge of the driving spindle and the location structure of the center match the rotating drive structure on the surface edge of the rivet head and the orientation structure of the center.

The matching is preferable to be:

① When the rotating drive structure is a number of wedge notches distributed uniformly along the circumference direction, the bottom of the driving spindle is corresponding to a number of wedge-shaped protrusions along the circumferential distribution, and the number of the wedge-shaped protrusions is equal to the number of the wedge notches, and the shape of the wedge-shaped notches is complementary to the shape of the wedge-shaped protrusions.

Each side of the wedge-shaped notch and the wedge-shaped protrusion is provided with chamfering for avoiding over-positioning.

② When the positioning structure is a conical groove, the bottom of the driving spindle is provided with a positioning protruding platform, and the positioning protruding platform has the same taper with the positioning groove, and the height of the positioning protruding platform is less than the depth of the positioning groove.

The upper surface of the die has a fixed structure being set to the opposite position of the rivet to control the flow of the displaced material. The shape of the fixed structure includes but not limited to flat concave dies, the convex grooves, flat dies, and through holes.

The driving spindle can translate vertically along the axis and rotate circumferentially along the axis.

The invention relates to a rivet rotational feeding method for the above system, which comprises the following steps:

Step 1, placing the rivet vertically below the driving spindle and apply appropriate resistance to limit the axial movement and circumferential rotation of the rivet.

Step 2, moving the driving spindle to feed axially downwards rapidly until 2-5 mm away from the upper end of the rivet.

Step 3, feeding the driving spindle slowly axially and rotating it at the same time to enable automatical matching of the positioning structures on the driving spindle and on the rivet head. At the same time, the wedge-shaped protruding at the bottom edge of the drive rod is in contact with the wedge-shaped notches on the edge of the rivet cover, and each pair of notches and protrusions. During the matching of the drive rod and the rivet, when the axial pressure or the circumferential torque of the drive rod is greater than the external resistance applied to the rivet, the rivet moves along the axial motion or rotates circumferentially with the driving spindle.

Step 4, the driving spindle and rivet moving together to the end of the rivet distance 2-5 mm, the drive rod axial and circumferential motion to speed up the parameters of the empty stroke. After then the rivet is driven to move by the driving rob at required process parameters to complete the F-SPR process.

Technical Effects

Compared with the existing technology, the current invention uses the rotation driving structure on the rivet head to provide the torque required to rotate the rivet. The wedge-shaped notches are beneficial for quick clamping and automatic matching of the rivet in production. The close matching of the geometric features on the rivet head and on the driving spindle enables the stable rotation of the rivet. The matching of the positioning grooves of the rivet head and the positioning convex on the bottom surface of the driving spindle enables the rivet rotation axis to coincide with the geometry axis of the rivet. Another advantage of such invention is the reduced mass of the rivet by manufacturing the rivet with removing the materials to create the several features. The process can be made into single-side or two-sided according to the process demand.

Figure 3:
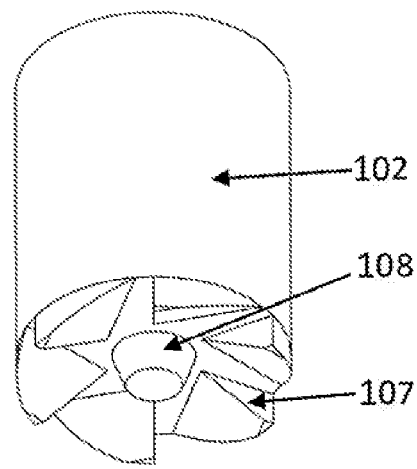

Wherein, a is the top view and b is the cross-section view along the A-A cutting surface FIG. 3 is the driving spindle of the F-SPR process in this invention.

Figures 4, 5:
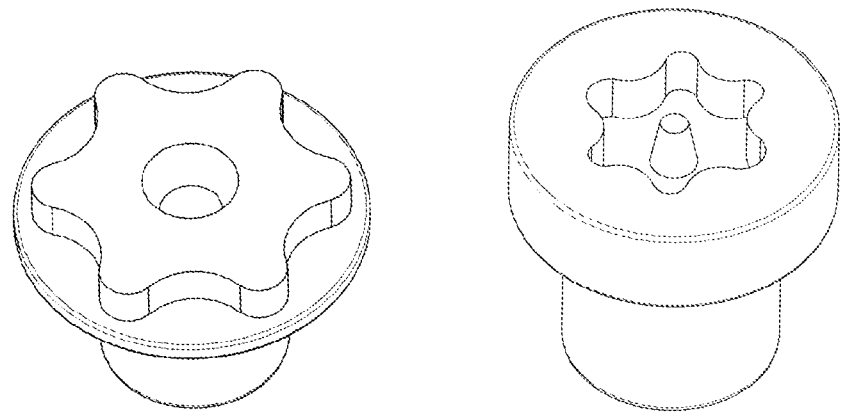

FIG. 4 is a schematic of the rivet head designed with the driving structures of plum-shaped-protrusion and a positioning structure of the conical-shaped groove.

FIG. 5 is a schematic of the rivet head designed with the driving structures of plum-shaped-groove and positioning structure of the conical-shaped protrusion.

Figure 6:
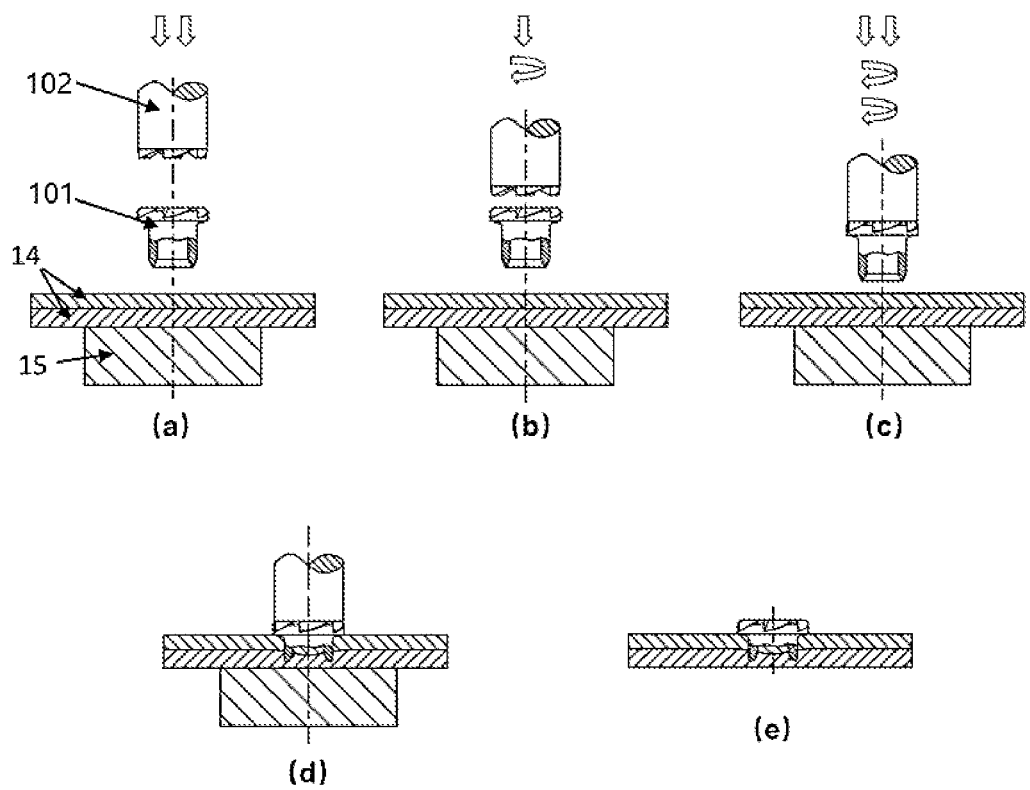

FIG. 6 is a schematic of the first example of implementation.

Wherein a-c shows the matching process of the rivet and the driving structure; d shows the relative positions of the rivet and the driving spindle after the F-SPR process; e shows the F-SPR joint profile.

Figure 7:
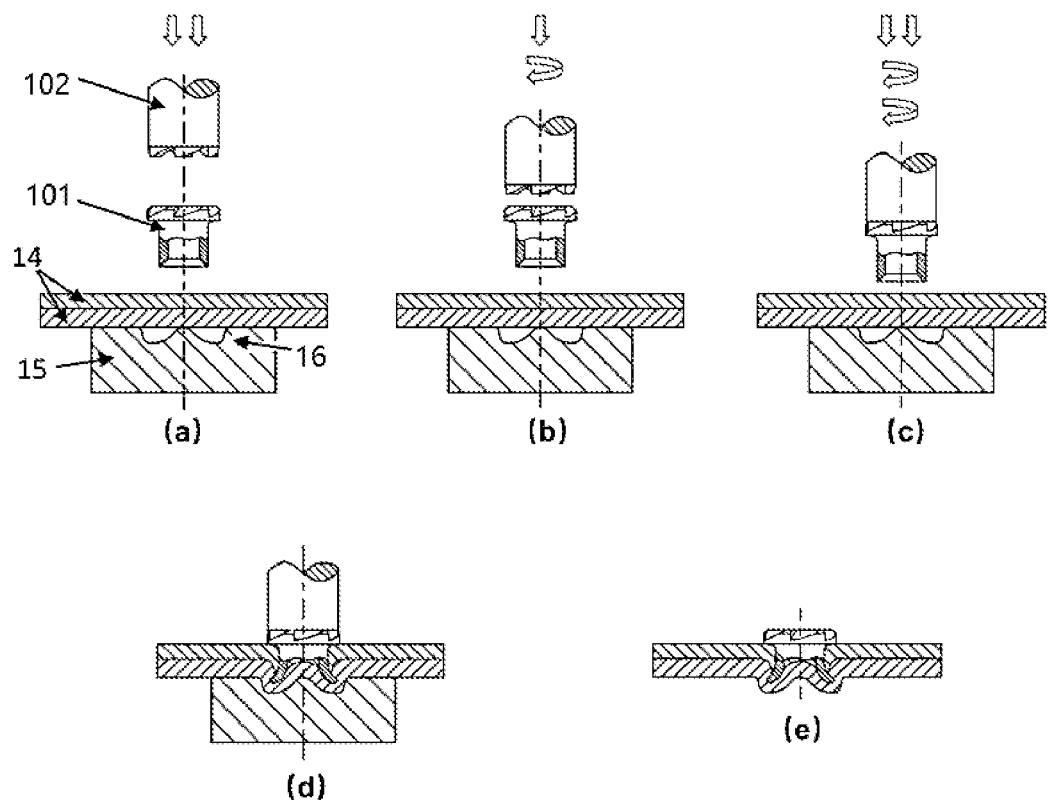

FIG. 7 is a schematic of the second example of implementation.

Wherein a-c shows the matching process of the rivet and the driving structure; d shows the relative positions of the rivet and the driving spindle after the F-SPR process; e shows the F-SPR joint profile.

Figure 8:
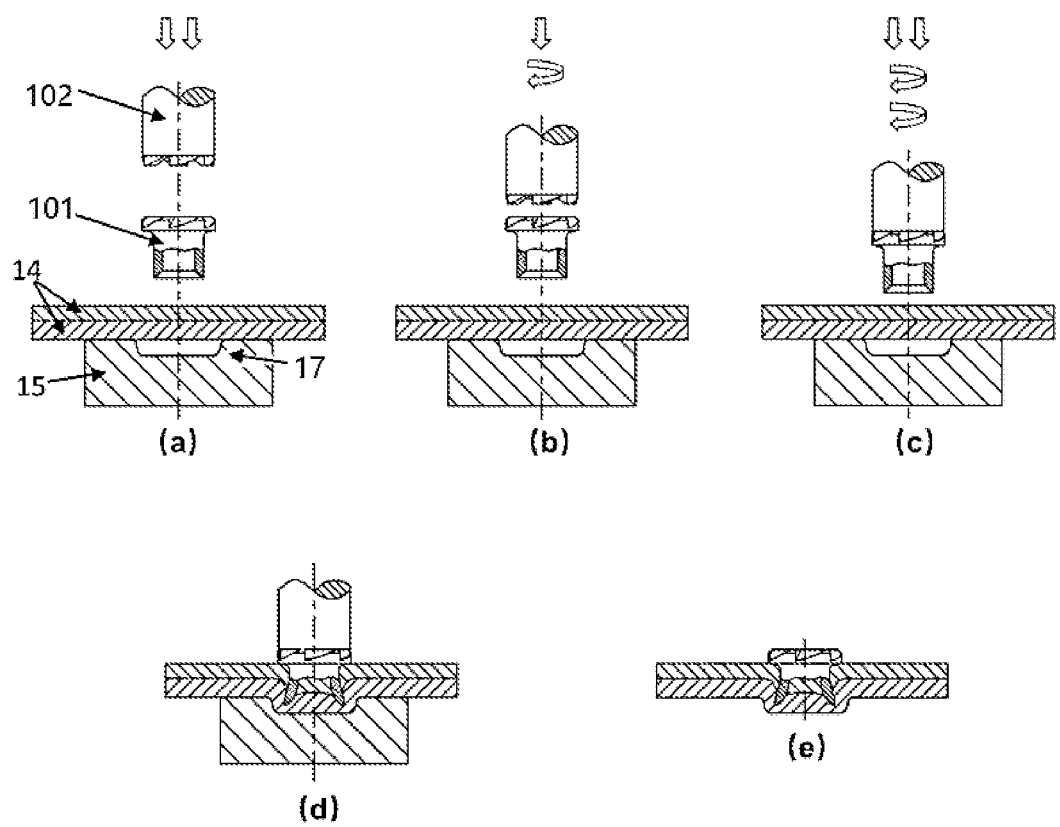

FIG. 8 is a schematic of the third example of implementation.

Wherein a-c shows the matching process of the rivet and the driving structure; d shows the relative positions of the rivet and the driving spindle after the F-SPR process; e shows the F-SPR joint profile.

Figure 9:
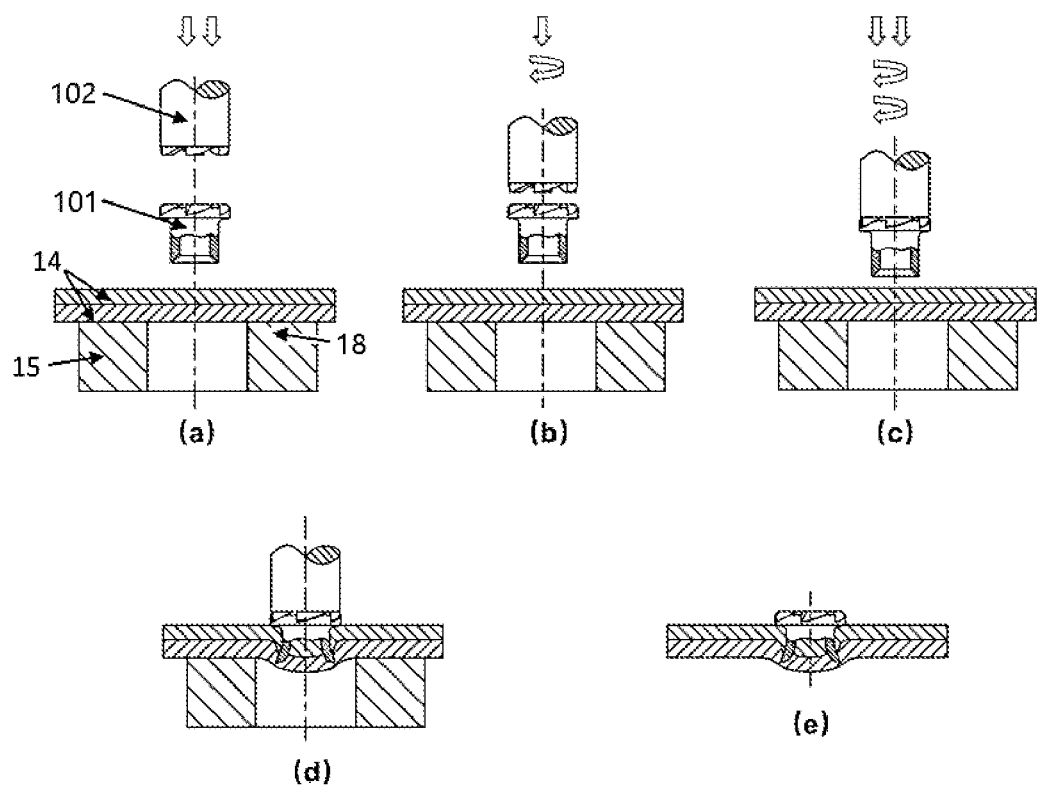

FIG. 9 is a schematic of the forth example of implementation.

Wherein a-c shows the matching process of the rivet and the driving structure; d shows the relative positions of the rivet and the driving spindle after the F-SPR process; e shows the F-SPR joint profile.

BEST MODE

Example 1

Figure 1:
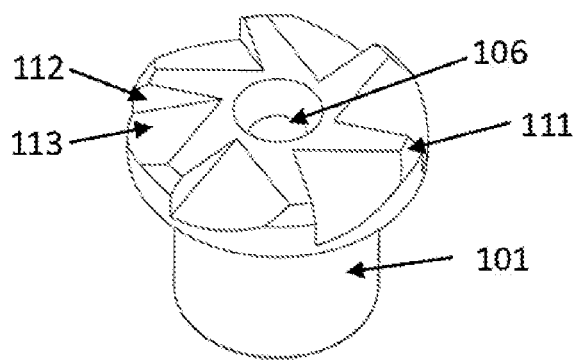
FIG. 1 is the schematic of the rivet in this invention.
Figure 2:
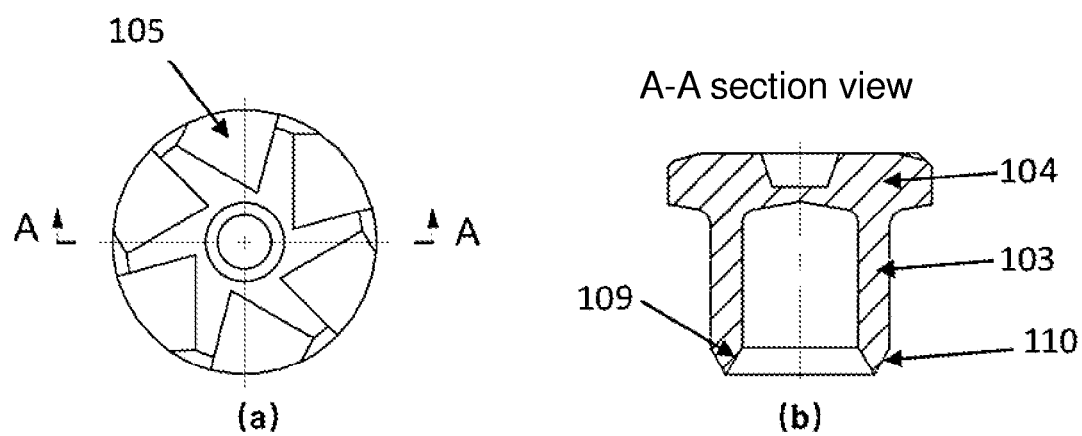
FIG. 2 is the top view and cross-section view of the rivet in this invention.

As shown in FIG. 1 and FIG. 2, the rivet 101 has a semi-hollow rivet shank 103 and a rivet head 104, which includes six wedge-shaped notches 105 and a positioning groove 106.

Wherein the semi-hollow rivet shank 103 has an inner diameter of 4.0 mm, an outer diameter of 6.0 mm and a depth of 5.0 mm.

Wherein the rivet head 104 has a diameter of 8.0 mm and a height of 2.0 mm.

Wherein the semi-hollow rivet 103 has a wedge-shaped end 110 with the tip 109 locating between the inner wall and the outer wall with 0.4 mm from the surface of the inner wall and 0.6 mm from the surface of the outer wall.

Wherein the rivet head 104 has chamfering 111, with the cone angel of 60°.

Wherein the six wedge-shaped notches 105 are distributed evenly along the circumferential direction and on the edge of the rivet head 104, which contains two intersecting planes 112 and 113. Wherein plane 112 is perpendicular to the top surface of the rivet head 104, plane 113 tilts from the top surface of the rivet head 104 to the bottom edge of the rivet head. The angle between plane 112 and plane 113 is 75°.

Wherein the positioning groove 106 is in the center of the rivet head 104 and has a conical shape, with the cone angel of 20° and the depth of 1.5 mm.

Wherein the positioning groove 106 has a coaxiality error of less than 0.0014 mm with the semi-hollow rivet shank 103.

Wherein angel between the bottom surface of the rivet head 104 and the outer surface of the semi-hollow rivet shank 103 is 80°.

Wherein the radius of the transition circle between the bottom surface of the rivet head 104 and the semi-hollow rivet shank 103 is 0.5 mm.

As shown in FIG. 4 and FIG. 5, the rotation driving structure is a centrally symmetric concave or convex surface. The positioning structure has a centrally and mirrored symmetric convex or concave surface. Wherein, the rivet head shown in FIG. 4 has a rotation driving structure of a plum shaped convex platform and a positioning structure of a conical groove. The rivet head shown in FIG. 5 has a rotary driving structure of the plum blossom groove and the positioning structure of the cone shaped protrusion.

As shown in FIG. 6, the F-SPR system contains a driving spindle 102, a die 15 and two workpieces 14 to be joined setting on the die 15, wherein the driving spindle 102 has a bottom surface that matches with the structures on the top surface of the rivet 101.

The matching means that the bottom surface of the driving spindle 102 has six wedge-shaped protrusions 107, the shape of which is complementary to the shape of the wedge-shaped notch 105.

Wherein the positioning protrusion 108 has a cone angle of 20° and a depth of 1.2 mm.

Wherein the six wedge-shaped notches 105 and the six wedge-shaped protrusions 107 have a 0.2 mm chamfering on each edge.

As shown in FIG. 6 (a), the workpieces 14 in this implementation are aluminum alloy AA6061-T6 and high strength steel DP780 with the thickness of 1.2 mm and 1.6 mm, respectively.

As shown in FIG. 6 (a)-(c), the F-SPR method contains the following steps:

Step 1: Locating the rivet 101 30 mm below the driving spindle 102 and apply resistance to the rivet 101 to restrain it axial translation or circumferential rotation motions.

Step 2: feeding the driving spindle 102 at a feed rate of 50 mm/s downwards to the location of 3.0 mm above the top surface of the rivet 101.

Step 3: feeding the driving spindle 102 at a feed rate of 2.0 mm/s and a spindle speed of 60 rpm. Under this motion of the driving spindle 102, the positioning protrusion 108 and the positioning groove 106 match with each other. The planes 112 on the six wedge-shaped notches 105 match with the corresponding planes on the six wedge-shaped protrusions 107. The bottom surface of the driving spindle 102 contacts with the top surface of the rivet 101. With the feeding and rotating motion of the driving spindle 102, the external resistance applied to the rivet 101 is destroyed and the rivet starts to move synchronized with the driving spindle 102 to rotate and to feed.

Step 4, when the driving spindle 102 and the rivet 101 move together to 2.0 mm above the workpieces 14, the driving spindle 102 speeds up to the predefined F-SPR process parameters, i.e., 900 rpm and 20 mm/s and drive the rivet 101 to move until the end of the F-SPR process.

After the F-SPR process described in this implementation, the final relative position of the rivet 101, the driving spindle 102 the workpieces 14 and the die 15 is shown in FIG. 6(d) and the final F-SPR joint cross-section profile is shown in FIG. 6(e).

The averaged tensile-shear strength of the F-SPR joints of aluminum alloy to high strength steel is 9.27 kN, which increased by 42.2% compared to the tensile-shear strength of the F-SPR joints of the same workpieces using the bolt rivet, 6.52 kN. Besides, the gap between the rivet shank and the sheets in the joint is reduces, which is beneficial to the improvement of the fatigue performance of the joint.

The Second Implementation

The rive 103 has a wedge-shaped end with the tip locating on the outer surface of the semi-hollow rivet shank.

As shown in FIG. 7 (a), the workpieces 14 are aluminum alloy AA6061-T6 and magnesium alloy AZ31B, with the thickness of 1.2 mm and 1.6 mm, respectively.

The workpieces 14 in this implementation are joined by F-SPR process using the rivet 101, the driving spindle 102 and the pip die 15.

Other embodiment in this implementation is the same with those in the first implementation.

After the F-SPR process described in this implementation, the final relative position of the rivet 101, the driving spindle 102 the workpieces 14 and the die 15 is shown in FIG. 7(d) and the final F-SPR joint cross-section profile is shown in FIG. 7(e).

The averaged tensile-shear strength of the F-SPR joints of aluminum alloy to high strength steel is 7.85 kN, which increased by 97.2% compared to the tensile-shear strength of the F-SPR joints of the same workpieces using the bolt rivet, 3.98 kN. Besides, the gap between the rivet shank and the sheets in the joint is reduces, which is beneficial to the improvement of the fatigue performance of the joint.

The Third Implementation

As shown in FIG. 8 (a), the workpieces 14 are aluminum alloy AA6061-T6 and aluminum casting Aural-2, with the thickness of 2.0 mm and 3.0 mm, respectively.

The workpieces 14 in this implementation are joined by F-SPR process using the rivet 101, the driving spindle 102 and the die 15 with a flat bottom 17.

Other embodiment in this implementation is the same with those in the first implementation.

After the F-SPR process described in this implementation, the final relative position of the rivet 101, the driving spindle 102 the workpieces 14 and the die 15 is shown in FIG. 8(d) and the final F-SPR joint cross-section profile is shown in FIG. 8(e).

The Forth Implementation

As shown in FIG. 9 (a), the workpieces 14 are aluminum alloy AA6061-T6 and carbon fiber reinforced plastic, CFRP, with the thickness of 1.2 mm and 2.0 mm, respectively.

The workpieces 14 in this implementation are joined by F-SPR process using the rivet 101, the driving spindle 102 and the die 15 with a through hole 18.

Other embodiment in this implementation is the same with those in the first implementation.

After the F-SPR process described in this implementation, the final relative position of the rivet 101, the driving spindle 102 the workpieces 14 and the die 15 is shown in FIG. 9(d) and the final F-SPR joint cross-section profile is shown in FIG. 9(e).

The above specific implementation may be partially adjusted by the technical personnel of the field without deviating from the principles and tenet of the invention in a different way. The scope of the protection of the invention is subject to the claim of rights and is not limited by the specific implementation, and the various implementation cases within its scope are bound by the invention.

What is claimed is:

1. A friction self-piercing rivet (F-SPR), comprising:
   a semi-tubed rivet shank, with a wedge shaped cone tip at its bottom end, wherein
   the rivet has a rivet head that connecting with an upper end of the rivet shank;
   the rivet head has a chamfering and rotary driving structures at its upper end, and a positioning structure in its center;
   the rotary driving structure is a central symmetric, concave or convex surface;
   the positioning structure is a central symmetric and mirror symmetric, concave or convex surface;
   wherein the rotary driving structure has several wedge-shaped notches, plum blossom shaped bosses or a plum blossom shaped grooves evenly distributed along a circumferential direction of the rivet head; the wedge-shaped notch has two intersecting planes, one of which is perpendicular to surface of the rivet head, designed for bearing a circumferential torque, and other one is tilted from the surface of the rivet head to lower end of the rivet head for dynamic matching; the plum blossom shaped bosses contain several petals evenly distributed along circumferential direction of the rivet head, which are used to bear circumferential torques; and the plum blossom shaped grooves contain several petals evenly distributed along circumferential direction of the rivet head, which are used to bear circumferential torques;
   wherein the concave or convex surface of the rotatory driving structure is a non-mirror symmetric structure.

2. The friction self-piercing rivet of claim 1, wherein the tip has a vertex conforming to an inner wall or an outer wall of the rivet shank or between the inner wall and the outer wall of the rivet shank.

3. The friction self-piercing rivet of claim 1, wherein the positioning structure is a cone shaped groove or a conical protruding platform.

4. The friction self-piercing rivet of claim 3, wherein the cone shaped groove is coaxial with a semi-hollow rivet shank to ensure that a rotation axis of the rivet is coincided with its geometric axis when a driving torque is applied.

5. The friction self-piercing rivet of claim 3, wherein the conical protruding platform is coaxial with a semi-hollow rivet shank to ensure that the rotation axis of the rivet is coincided with its geometric axis when a driving torque is applied.

6. A friction self-piercing riveting (F-SPR) system comprising:
   a driving spindle that is capable of driving a rivet for axial translational motion and circumferential rotational motion;
   a rivet comprising:
      a semi-tubed rivet shank, with a wedge shaped cone tip at its bottom end, wherein
      the rivet has a rivet head that connecting with an upper end of the rivet shank;
      the rivet head has a chamfering and rotary driving structures at its upper end, and a positioning structure in its center;
      the rotary driving structure is a central symmetric, concave or convex surface;
      the positioning structure is a central symmetric and mirror symmetric, concave or convex surface;
   a die on the bottom of a workpieces;
   wherein a driving spindle has a lower surface matching with an upper surface of the rivet head;
   wherein the matching is:
   ① when a rotatory driving system is in the form of several wedge-shaped notches, the driving spindle has several wedge-shaped projections evenly distributed along a circumferential direction on bottom;
   wherein the number of wedge-shaped projections is equal to the number of the wedge-shaped notches;
   wherein the shape of the wedge-shaped projections is complementary to the shape of the wedge-shaped notch, and:
   ② when the positioning structure is cone-shaped groove, the driving spindle has a positioning protruding on bottom;
   wherein the positioning protrusion has a same taper with the positioning grooves;
   wherein the positioning protrusion has a height smaller than the depth of the positioning groove.

7. The F-SPR system of claim 6, wherein the wedge-shaped notch and wedge-shaped protrusion have chamfering on each edge for avoiding over positioning.

8. The F-SPR system of claim 6, wherein the die has an upper surface designing with fixed structures on top end to control plastic flow of the workpieces in riveting.

9. The F-SPR system of claim 8, wherein the fixed structure includes a die with a flat surface, a pip die, a die with a concave flat bottom and a die with a through hole.

10. The F-SPR system of claim 6, wherein a process for rivet rotational feeding includes:
  Step 1, placing the rivet vertically under the driving spindle and applying appropriate resistance to restrain an axial translational motion and rotational motion of the rivet;
  Step 2, feeding the driving spindle straightly downwards to the upper surface of the rivet;
  Step 3, feeding the driving spindle axially downward slowly and, at the same time, rotating the driving spindle to match the positioning structure of the driving spindle automatically with the positioning structures in the center of the rivet head; making the rotary driving structures on bottom of the driving spindle contacting with the driving structures on the top of the rivet head; the surfaces of the rivet head and on the driving spindle contact with each other, wherein bottom surface of the driving spindle contact with the top surface of the rivet head;
  during the mating of the driving spindle and the rivet, when an axial pressing force or a circumferential torque exerted on the rivet by the driving spindle exceeds external resistance applied to the rivet, the rivet starts to move axially or circumferentially with the driving spindle;
  Step 4, when the driving spindle and the rivet move together approaching the surface of the workpieces, speed of the axial and circumferential motion of the driving spindle switch to required process parameters of F-SPR process and drive the rivet to finish the F-SPR process under setting process parameters.

* * * * *